United States Patent
Allport et al.

(10) Patent No.: US 6,795,813 B2
(45) Date of Patent: *Sep. 21, 2004

(54) SYSTEM AND METHOD FOR LINKING AN INDICIUM WITH ADDRESS INFORMATION OF A MAILPIECE IN A CLOSED SYSTEM POSTAGE METER

(75) Inventors: Robert W. Allport, Harlow (GB); Stephen Kelly, Welwyn Garden City (GB); Timothy J. Nicholls, Standon Herts (GB)

(73) Assignee: Pitney Bowes Inc., Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/224,255

(22) Filed: Dec. 30, 1998

(65) Prior Publication Data

US 2002/0046192 A1 Apr. 18, 2002

(51) Int. Cl.$^7$ ............................................... G06F 17/60
(52) U.S. Cl. .......................... 705/60; 705/62; 705/50; 705/400; 380/55
(58) Field of Search .............................. 705/60, 61, 62, 705/63, 50, 400–500; 380/229, 232, 55

(56) References Cited

U.S. PATENT DOCUMENTS

| | | |
|---|---|---|
| 4,639,873 A | 1/1987 | Baggarly et al. |
| 4,725,718 A | 2/1988 | Sansone et al. |
| 4,734,865 A | 3/1988 | Scullion et al. |
| 4,743,747 A | 5/1988 | Fougere et al. |
| 4,797,830 A | 1/1989 | Baggarly et al. |

(List continued on next page.)

FOREIGN PATENT DOCUMENTS

| | | |
|---|---|---|
| EP | 0356228 A2 | 8/1989 |
| EP | 0356228 | 8/1989 |
| EP | 0604148 | 6/1994 |
| EP | 0710930 | 10/1995 |
| EP | 0759596 | 8/1996 |
| JP | 408273011 A | * 10/1996 |
| WO | 97/14117 | 4/1997 |

OTHER PUBLICATIONS

IEEE; Cryptographic Postage Indicia; No. c9706-7185-003; copyright 1997.*
Tygar, J.D. and Lee, B., "Cryptography: It's Not Just For Electronic Mail Anymore" Technical Report CMU-CS-93-107, Carnegie Mellon University, Mar. 1, 1993.
Dougherty, Philip, "Advertising: Postage Stamp as Ad Medium" New York Times, Feb. 14, 1986, Sec. 4, Col. 1, p. 15 (Abstract Only).
United States Postal Service (USPS), Information Based Indicia Program (IBIP) Indicium Specification, Jun. 13, 1996.
USPS, Information Based Indicia Program Indicium Specification (IBIP), Jun. 13, 1996, United States Postal Service, XPOOO213773, p. 3.1–p. 3.4, p. 5.1.

*Primary Examiner*—James P. Trammell
*Assistant Examiner*—Pierre E. Elisca
(74) *Attorney, Agent, or Firm*—Brian. A. Lemm; Angelo N. Chaclas

(57) ABSTRACT

System and method is provided for adding addressing information to an indicium printed by a closed system metering device. A scanning device is coupled to a closed system postage meter for scanning addressing information printed on a mailpiece. The addressing information is combined with other information relating to the postage payment for the mailpiece to obtain postal data relating to the mailpiece. The postal data, including the addressing information is used to generate an indicium for the mailpiece. The indicium includes cryptographic evidencing of postage payment. The closed system metering device prints the indicium on the mailpiece.

10 Claims, 3 Drawing Sheets

U.S. PATENT DOCUMENTS

| | | | |
|---|---|---|---|
| 4,831,554 A | | 5/1989 | Storace et al. |
| 4,831,555 A | * | 5/1989 | Sansone et al. |
| 4,873,645 A | | 10/1989 | Hunter et al. |
| 4,959,795 A | | 9/1990 | Christensen et al. |
| 5,008,827 A | | 4/1991 | Sansone et al. |
| 5,024,153 A | | 6/1991 | Bannister et al. |
| 5,039,075 A | | 8/1991 | Mayer |
| 5,043,908 A | | 8/1991 | Manduley et al. |
| 5,058,030 A | | 10/1991 | Schumacher |
| 5,072,400 A | | 12/1991 | Manduley |
| 5,087,805 A | | 2/1992 | Silverschotz et al. |
| 5,168,804 A | | 12/1992 | Lee et al. |
| 5,177,687 A | | 1/1993 | Baggarly et al. |
| 5,249,687 A | | 10/1993 | Rosenbaum et al. |
| 5,387,783 A | | 2/1995 | Mihm et al. |
| 5,390,251 A | * | 2/1995 | Pastor et al. |
| 5,437,441 A | | 8/1995 | Tuhro et al. |
| 5,452,654 A | | 9/1995 | Connell et al. |
| 5,454,038 A | | 9/1995 | Cordery et al. |
| 5,490,077 A | | 2/1996 | Freytag |
| 5,493,106 A | | 2/1996 | Hunter |
| 5,579,449 A | | 11/1996 | Strobel |
| 5,586,036 A | | 12/1996 | Pintsov |
| 5,657,689 A | | 8/1997 | Lee |
| 5,682,427 A | | 10/1997 | Seestrom |
| 5,703,783 A | | 12/1997 | Allen et al. |
| 5,731,574 A | | 3/1998 | Bodie et al. |
| 5,748,484 A | | 5/1998 | Cannon et al. |
| 5,761,648 A | | 6/1998 | Golden et al. |
| 5,796,834 A | | 8/1998 | Whitney et al. |
| 5,801,944 A | * | 9/1998 | Kara |
| 5,812,401 A | | 9/1998 | Moore |
| 5,819,240 A | * | 10/1998 | Kara ........................ 705/408 |
| 5,819,241 A | | 10/1998 | Reiter |
| 5,822,739 A | | 10/1998 | Kara |
| 5,953,427 A | | 9/1999 | Cordery et al. |
| 5,978,781 A | | 11/1999 | Sansone |
| 6,009,417 A | | 12/1999 | Brookner et al. |
| 6,019,281 A | | 2/2000 | Emmett et al. |
| 6,026,385 A | | 2/2000 | Harvey et al. |
| 6,035,290 A | | 3/2000 | Pintsov |
| 6,041,704 A | | 3/2000 | Pauschinger |
| 6,064,994 A | | 5/2000 | Kubatzki et al. |
| 6,081,795 A | | 6/2000 | Ryan, Jr. |
| 6,108,643 A | * | 8/2000 | Sansone ...................... 705/62 |
| 6,125,357 A | * | 9/2000 | Pintsov ...................... 705/408 |
| 6,134,328 A | * | 10/2000 | Cordery et al. ............... 380/55 |
| 6,157,919 A | * | 12/2000 | Cordery et al. ............... 705/60 |
| 6,175,827 B1 | * | 1/2001 | Cordery et al. ............. 705/410 |
| 6,178,411 B1 | | 1/2001 | Reiter |
| 6,424,954 B1 | | 7/2002 | Leon |

\* cited by examiner

SYSTEM AND METHOD FOR LINKING AN INDICIUM WITH ADDRESS INFORMATION OF A MAILPIECE IN A CLOSED SYSTEM POSTAGE METER

CROSS REFERENCE TO RELATED APPLICATIONS

This application is related to the following co-pending applications filed concurrently herewith and commonly assigned to the assignee of this application: U.S. patent application No. 09/223,116, entitled SYSTEM AND METHOD FOR SELECTING AND ACCOUNTING FOR VALUE-ADDED SERVICES WITH A CLOSED SYSTEM METER; and U.S. patent application No. 09/222,644, entitled CLOSED METER SYSTEM HAVING ADDRESS CORRECTION CAPABILITIES, each of which are specifically incorporated herein by reference.

FIELD OF THE INVENTION

The present invention relates generally to postage printing systems. More particularly, the present invention is directed to closed system postage metes that print digital indicia.

BACKGROUND OF THE INVENTION

The vast majority of the Posts around the world require prepayment for postal services provided by the Posts. This allows the Posts to avoid the substantial time and cost associated with a post-payment system that requires processing billing data and collecting and processing remittance. Prepayment, however, necessitates that individual mailpieces carry verifiable evidence of paid postage. The traditional postage stamp is a prime example of such evidence. Although postage stamps are good for many applications by low volume mailers, for moderate to high volume mailers the application of stamps is difficult and costly and is subject to theft. Furthermore, stamps do not provide information such as date and place of mailing and provide limited postal revenue security.

Arthur Pitney invented the first postage meter in 1902 to alleviate some shortcomings of postage stamps. This postage meter was a mechanical device with securely coupled printing and accounting functions. The mechanical meter became a widespread basic business machine. With the advent of the microprocessor, the accounting and machine control functions were computerized when electronic postage meters were introduced in the late seventies. This enabled new features, including departmental accounting and computerized meter resetting. However, the fundamental security of postage evidencing remained the same.

Postal revenue security in the analog postage meters, such as the mechanical and electronic postage meters, depends on two features: 1) physical security of the printing process, i.e., printing of postage evidence can not occur without appropriate accounting, and 2) forensic detectability, i.e., fraudulent postal indicia can be distinguished from legitimate indicia.

Coupling the printing and accounting mechanism within a secure tamper-evident enclosure provides physical security of printing. Inspection of the device normally reveals tampering. Effective forensic detectability of fraudulent postal indicia depends on non-availability of alternative mechanisms suitable for forging indicia. Before the proliferation of inexpensive, high print quality computer printers, serious attempts to generate fraudulent indicia using an alternate printing mechanism were detectable.

Today, the availability of inexpensive computer-driven printers provides opportunities for customer convenience and cost advantages for printing postage evidence. However, the use of such printers requires a new way of securing postage, which was first suggested in U.S. Pat. Nos. 4,641,347, 4,641,346, 4,757,537, and 4,775,246. At that time, it was realized that the security of postage evidencing depends on the security of the information printed in the indicium, including message authentication and integrity. U.S. Pat. Nos. 4,831,555 and 4,725,718 extended this idea to unsecured printing of postage disclosing the necessity that at least some of the information in the indicium must appear random to a party not in possession of some secret. Such random looking information is commonly referred to as a digital token.

The basis of postal revenue security in the digital world is two new requirements: 1) security of the digital token generating process, i.e., digital tokens can not be generated without appropriate accounting, and 2) automatic detectability, i.e., fraudulent digital tokens can be detected by automatic means.

A cryptographic transformation applied to selected data on the mailpiece produces the digital token. The data may include postage value, date, postal code of the geographical deposit area, recipient address information, meter data, and piece count. Such data is commonly referred to as postal data. The secret used to generate the digital token is generally a cryptographic key held within the accounting device. A verifier, with access to a verifying key corresponding to the accounting device secret, validates the digital token. Several cryptographic algorithms and protocols have been considered for this purpose. U.S. Pat. No. 4,853,961 describes critical aspects of public-key cryptography for mailing applications. See José Pastor, "CRYPTOPOST™ A Universal Information-Based Franking System for Automated Mail Processing", *Proceedings of the Fourth Advanced Technology Conference of the U.S. Postal Service*, Vol. I, pp. 429–442, November 1990. See also José Pastor, "CRYPTOPOST™ A Cryptographic Application to Mail Processing", *Journal of Cryptology*, 3 (2), pp. 137–146, November 1990.

Two methods of presenting a postal verifier with fraudulent evidence of payment are a counterfeited indicium and a copied indicium. The former is an unpaid indicium that appears legitimate. The latter is a replay of a legitimate paid indicium. The present invention addresses the prevention of counterfeit indicium.

A counterfeit indicium can be detected by verifying the digital token. Verification proves that a cryptographic algorithm generated the digital token with access to the secret meter key. The information printed in the indicium and access to a verifying key are sufficient for the detection of counterfeited indicia as long as the secret meter key is confidential. In a public-key system, a digital signature provides the data authentication and integrity check. In a symmetric-key system, a message authentication code (MAC) provides a similar check. Detection of counterfeiting is an integrity check.

Assuming integrity of the verification software and hardware, only a compromised meter secret-key can produce counterfeit indicia that pass an integrity check. This compromise could happen by violating the physical protection of the key by tampering, or by deriving the key from indicia data by cryptanalysis. Generally, tampering is detectable if the physical protection of the secure component of the postage metering system is adequate, for example following FIPS 140-1, Security Requirements for Cryptographic Modules, National Institute for Standards and Technology, January 1994. Robustness against cryptanalysis depends on the difficulty of solving certain mathematical problems, for example, discrete logarithm problems or factoring a large composite number. As part of its proposed Information-Based Indicia Program (IBIP), the USPS has proposed 1024 bit RSA or 1024 bit DSS as a measure of robustness, The IBIP is a distributed trusted system that is expected to support new methods of applying postage in addition to, and eventually in lieu of, the current approach, which typically relies on a postage meter to mechanically print indicia on mailpieces. The IBIP requires printing large, high density, two-dimensional (2-D) bar codes on mailpieces. The Postal Service expects the IBIP to provide cost-effective assurance of postage payment for each mailpiece processed.

The USPS has published draft specifications for the IBIP. The INFORMATION BASED INDICIA PROGRAM (IBIP) INDICIUM SPECIFICATION, dated Jun. 13, 1996, defines the proposed requirements for a new indicium that will be applied to mail being processed using the IBIP. The INFORMATION BASED INDICIA PROGRAM POSTAL SECURITY DEVICE SPECIFICATION, dated Jun. 13, 1996, defines the proposed requirements for a Postal Security Device (PSD) that will provide security services to support the creation of a new "information based" postage postmark or indicium that will be applied to mail being processed using the IBIP. The INFORMATION BASED INDICIA PROGRAM HOST SYSTEM SPECIFICATION, dated Oct. 9, 1996, defines the proposed requirements for a host system element of the IBIP. The specifications are collectively referred to herein as the "IBIP Specifications". The IBIP includes interfacing user (customer), postal and vendor infrastructures which are the system elements of the program.

Presently, there are two postage metering types: closed systems and open systems. In a closed system, the system functionality is solely dedicated to metering activity. Examples of closed system metering devices include conventional digital and analog (mechanical and electronic) postage meters wherein a dedicated printer is securely coupled to a metering or accounting function. In a closed system, since the printer is securely coupled and dedicated to the meter, printing evidence of postage cannot take place without accounting for the evidence of postage. In an open system, the printer is not dedicated to the metering activity, freeing system functionality for multiple and diverse uses in addition to the metering activity. Examples of open system metering devices include personal computer (PC) based devices with single/multi-tasking operating systems, multi-user applications and digital printers. An open system metering device is a postage evidencing device with a non-dedicated printer that is not securely coupled to a secure accounting module. Open system indicia printed by the non-dedicated printer are made secure by including addressee information in the encrypted evidence of postage printed on the mailpiece for subsequent verification.

Conventional closed system mechanical and electronic postage meters have heretofore secured the link between printing and accounting. The integrity of the physical meter box has been monitored by periodic inspections of the meters. Digital printing postage meters, which are closed system postage meters, typically include a digital printer coupled to a metering (accounting) device, which is referred to herein as a postal security device (PSD). Digital printing postage meters have removed the need for physical inspection by cryptographically securing the link between the accounting and printing mechanisms. In essence, new digital printing postage meters create a secure point to point communication link between the accounting unit and printhead. See, for example, U.S. Pat. No. 4,802,218, issued to Christopher B. Wright et al and now assigned to the assignee of the present invention. An example of a digital printing postage meter with secure printhead communication is the Personal Post Office™ manufactured by Pitney Bowes Inc. of Stamford, Conn. An example of a digital printing postage meter in a secure housing is the PostPerfect™ also manufactured by Pitney Bowes Inc. of Stamford, Conn.

In U.S. Pat. No. 5,682,427, a system is disclosed wherein either open or closed system indicia may be printed. The system includes a closed system meter coupled to a computer that is part of an open system meter. This hybrid system prints an open system indicium, i.e., with addressee information included in the evidence of postage payment, when the indicium is printed simultaneously with the addressing of an envelope. The system prints a closed system indicium, i.e., without addressee information included in the evidence of postage payment, when the indicium is printed separately from the addressing of an envelope, for example, on pre-printed envelopes.

One disadvantage with having two types of indicia is that two verification processes are needed. At the present, an indicium printed by an open system meter includes addressee information in the encrypted evidence of postage printed on the mailpiece, but an indicium printed by a closed system meter does not. Thus, a verification system must recognize which type of indicium is being verified before performing an accurate verification. Such verification system may require separating the two indicium types for separate verification processing.

SUMMARY OF THE INVENTION

In accordance with the present invention, closed system meters can print an open system indicium by scanning addressee information printed on a mailpiece before generating the indicium. In this manner, the present invention links an indicium with a mailpiece, and potentially eliminates the need for closed system indicia. Consequently, there would be only one type of indicium printed and, therefore, only one verification system would be needed to verify all digitally printed indicium. An additional benefit resulting from the present invention is that the verification system would detect any fraudulent use of duplicated indicia that are used to send mailpieces to different locations, whether generated by closed system or open system meters.

In accordance with the preferred embodiment of the present invention, addressee information, such as a postal code or the entire address, is printed on the mailpiece, preferably in bar code format, when the envelope is addressed. The bar code is scanned by a bar code reader which is operatively coupled to a closed system postage meter, for example in a mailing machine that is processing the mailpiece. Alternatively, an optical character recognition (OCR) reader may scan an alphanumeric address printed on the mailpiece. The addressee information is then included in the information used to encode the indicium for postage evidencing. At verification, the indicium is verified using the same verification process used for verifying open system indicium.

In accordance with the present invention, system and method are provided for printing open system indicium on a closed system meter.

The present invention links the indicium to the mailpiece by adding addressing information to an indicium printed by a closed system metering device. A scanning device is coupled to a closed system postage meter for scanning addressing information printed on a mailpiece. The addressing information is combined with other information relating to the postage payment for the mailpiece to obtain postal data relating to the mailpiece. The postal data, including the addressing information is used to generate an indicium for the mailpiece. The indicium includes cryptographic evidencing of postage payment. The closed system metering device prints the indicium on the mailpiece.

Therefore, it is now apparent that the present invention substantially overcomes the disadvantages associated with the prior art. Additional advantages of the invention will be set forth in the description, which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PREFERRED EMBODIMENTS

With the advent of PC metering systems, such as set forth in the IBIP Specifications and in U.S. Pat. Nos. 4,725,718, 4,743,747 and 5,781,438, the benefit of linking a mailpiece to an indicium has been recognized. The present invention enables closed system meters to link a destination address of a mailpiece to the indicium printed on the mailpiece.

Figure 1:
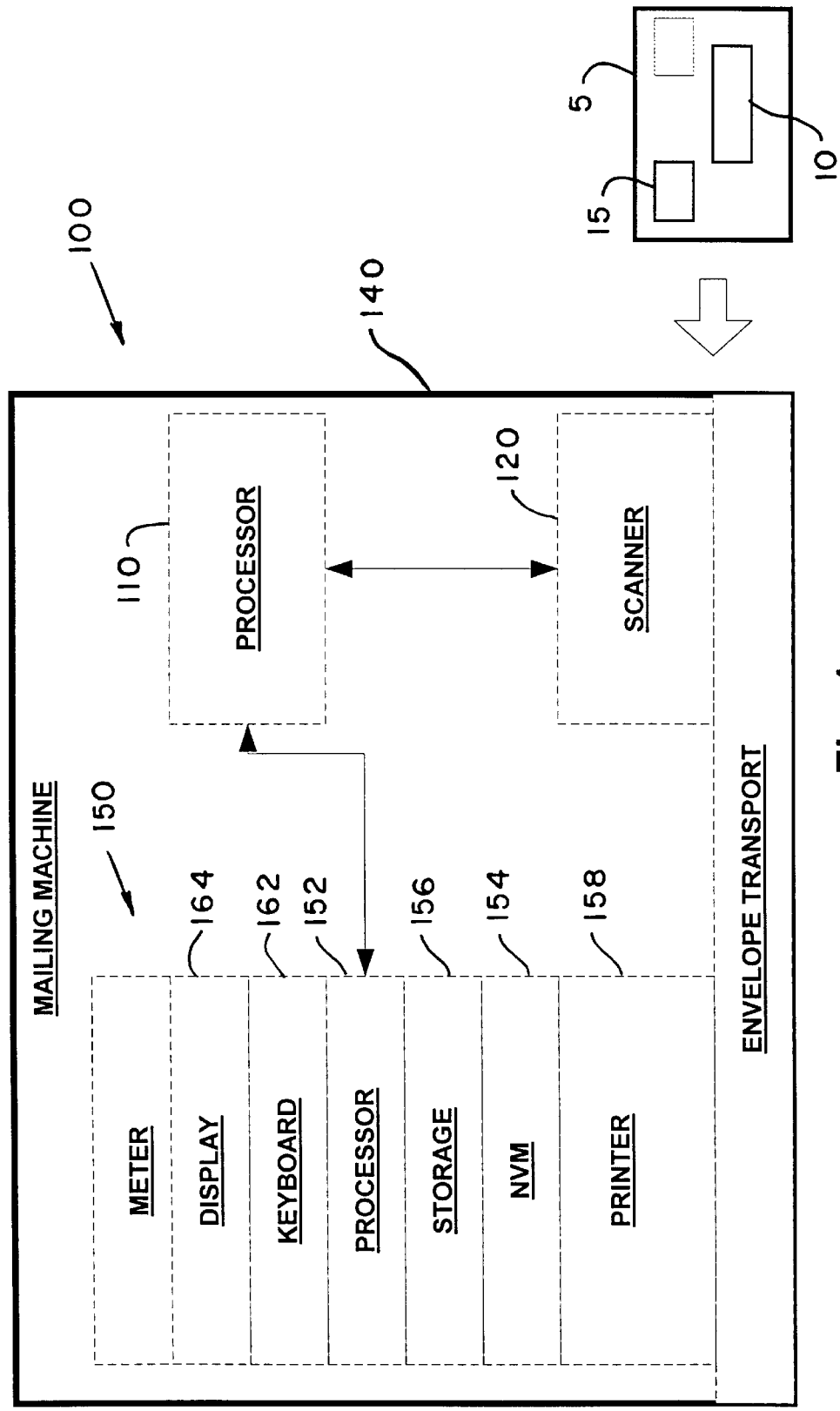
FIG. 1 is a preferred embodiment of a closed system metering device in accordance with the present invention.

Referring now to FIG. 1, a closed system metering device is shown for printing a postal indicia on envelope 5, which has an addressee block 10, and a return address 15. In a preferred embodiment of the present invention, the closed system metering device is a mailing machine, generally designated 100. Mailing machine 100 includes a processor 110, a scanner 120, a postage meter, generally designated 150, and an envelope transport 140. Meter 150 includes a processor 152, non-volatile memory (NVM) 154, storage means 156 and a digital printer 158. A typical closed system meter is described in more detail below. Scanner 120 preferably is a bar code scanner for scanning addressee information printed on envelope 5 in bar code format. Alternatively, scanner 120 may be an OCR reader for reading the alphanumeric addressee information printed on envelope 5.

The postage meter 150 includes a conventional printing module 158. The printing module 158 includes printing structure (not shown) such as any conventional thermal, ink jet, laser or other commercially available printing structure that is suitable for printing a digital indicium on envelope 5. Printing module 158 may include a conventional control circuit (not shown) which is connected to a microprocessor 152, as hereinafter described, and is conventionally constructed and arranged for communicating input signals thereto from the scanner 120, and communicating control signals therefrom for operation of the printing, feeding and value setting structures, under the control of the microprocessor 152. Postage meter 150 additionally includes a keyboard 162 and a display 164.

The postage meter 150 also preferably includes a suitable NVM 154. The NVM 154 preferably includes: structure for storing descending register (total postage currently available for printing) and ascending register (total of all postage value increments which have ever been entered, and thus been made available to the printing module 158 for printing by the postage meter 150, during the life of the postage meter 150). Preferably, the NVM 154 additionally includes conventional structure for storing the serial number of the postage meter 150. Further, depending on the type of printing structure 158 utilized in the postage meter 150, the NVM 154 may include conventional structure for storing data corresponding to a graphic image of a postage indicium. Moreover, the NVM 154 is conventionally operable under the control of the microprocessor 152 for decrementing the descending register and incrementing the ascending register by an amount which is equal to the current requested postage value which is to be printed by the printing module 158.

Figure 2:
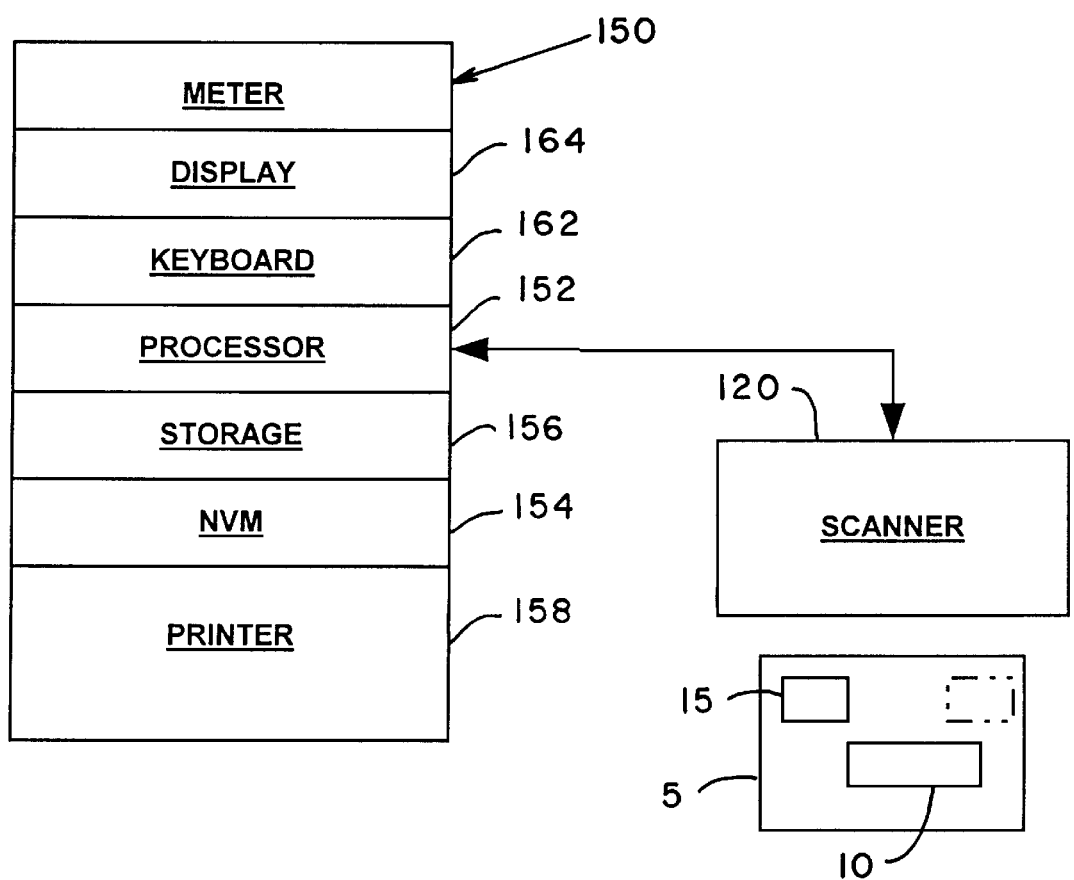
FIG. 2 is an alternate embodiment of a closed system metering device in accordance with the present invention.

Referring now to FIG. 2, a first alternate embodiment of the present invention is shown in which a scanner 120, such as a barcode reader or OCR reader, is added to an existing stand-alone, closed system postage meter 150. The closed system postage meter 150 is coupled to scanner 120 in a conventional manner. Meter 150 includes a processor 152, NVM 154, storage means 156 and a printer 158.

During mailpiece generation, elements of the address are used to generate a code specific to the mailpiece destination address. Such elements may be a postal code (zip code) or may include other elements such as a house number or street name. Once the code has been generated, it can be printed, preferably in bar code format, with the address, for example, in the address block of the mailpiece. A bar code is preferable because it is more reliable to scan in a bar code than to OCR scan the alphanumeric characters from the address block of the mailpiece.

When the mailpiece is inserted into the postage metering device, the address code is scanned from the mailpiece and transmitted to the metering device so that it can be encoded into the indicium. If the address code is used to generate a cryptographic signature or digital token, then the address code can be scanned during the verification process to verify the validity of the indicium as well as providing a link back to the mailpiece. For a description of the generation of a digital token, see U.S. Pat. No. 5,781,438, which is hereby incorporated by reference.

Figure 3:
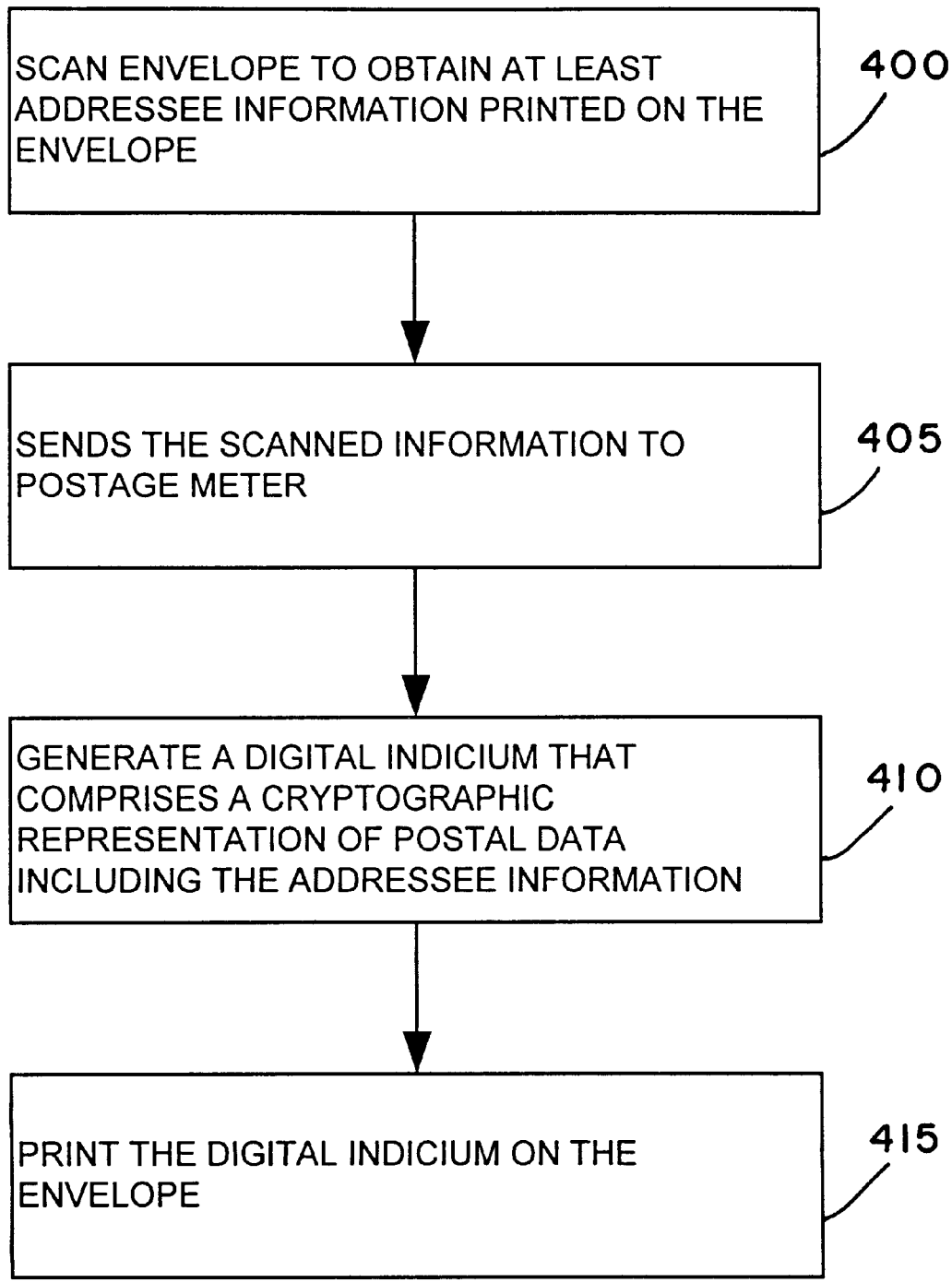
FIG. 3 is a flow chart of a method for linking an indicium to a mailpiece for closed system meter devices of FIGS. 1 and 2.

Referring now to FIG. 3 with reference to FIGS. 1 and 2, the process of linking an indicium printed by a closed system postage meter to the mailpiece on which it is printed. At step 400, scanner 120 scans the envelope to obtain at least addressee information printed on the envelope. At step 405, the scanner sends the scanned information to postage meter 150, which generates, at step 410, generates a digital indicium that comprises a cryptographic representation of postal data including the addressee information. At step 415, meter 150 prints the digital indicium on the envelope.

Many features of the embodiments disclosed herein represent design choices selected to best exploit the inventive concept as implemented in a particular virtual postage meter environment. However, those skilled in the art will recognize that various modifications can be made without departing from the spirit of the present invention. For example, the closed system postage meter 150 may be a virtual, closed system postage meter as described in U.S. patent application Ser. No. 08/993,358, filed Dec. 18, 1997, which is hereby specifically incorporated herein by reference.

Therefore, the inventive concept in its broader aspects is not limited to the specific details of the preferred embodiments described above, but is defined by the appended claims and their equivalents.

What is claimed is:

1. A method for adding addressing information to an indicium printed by a closed system metering device, the method comprising:

coupling a scanning device to a closed system postage meter;

scanning addressing information printed on a mailpiece;

combining the addressing information with other information relating to the postage payment for the mailpiece to obtain postal data relating to the mailpiece;

using the postal data to generate an indicium for the mailpiece, the indicium including cryptographic evidencing of postage payment;

printing the indicium on the mailpiece.

2. The method of claim 1 wherein the scanning device is a bar code reader and the addressing information scanned on the mailpiece is printed in bar code format.

3. The method of claim 1 wherein the cryptographic evidencing of postage payment is in the form of a digital signature.

4. The method of claim 1 wherein the other information relating to the mailpiece includes at least one of date of mailing, piece count, postage amount and an identification number of the closed system postage meter.

5. A postage metering system comprising:

a closed system meter including means for generating a digital indicium and means for printing the digital indicium; and means operatively coupled to the closed system meter for scanning information printed on an envelope;

wherein the generating means includes a cryptographic operation using the scanned information to generate the digital indicium, the digital indicium including at least a portion of the scanned information.

6. The system of claim 5 wherein the means for generating a digital indicium includes a cryptographic operation using the scanned information.

7. The system of claim 5 wherein the scanning means comprises a bar code scanner and the scanned information is printed in bar code format on the envelope.

8. The system of claim 5 wherein the scanning means comprises an optical character recognition reader and the scanned information is printed in alphanumeric format on the envelope.

9. The system of claim 5 wherein the closed system meter is operatively coupled to a mailing machine.

10. The system of claim 5, wherein the scanned information printed on an envelope includes recipient address information, and the digital indicium includes at least a portion of the recipient address information.

* * * * *